(12) United States Patent
Uno

(10) Patent No.: US 10,488,849 B2
(45) Date of Patent: Nov. 26, 2019

(54) NUMERICAL CONTROLLER FOR CONTROLLING FEED RATE BASED ON SPINDLE LOAD

(71) Applicant: FANUC CORPORATION, Minamitsuru-gun, Yamanashi (JP)

(72) Inventor: Kousuke Uno, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 225 days.

(21) Appl. No.: 15/358,648

(22) Filed: Nov. 22, 2016

(65) Prior Publication Data

US 2017/0153629 A1 Jun. 1, 2017

(30) Foreign Application Priority Data

Nov. 26, 2015 (JP) .................................. 2015-230615

(51) Int. Cl.
G05B 19/416 (2006.01)

(52) U.S. Cl.
CPC .................. *G05B 19/4163* (2013.01); *G05B 2219/37336* (2013.01); *G05B 2219/49074* (2013.01)

(58) Field of Classification Search
CPC ...... G05B 19/4163; G05B 2219/37336; G05B 2219/49074
See application file for complete search history.

(56) References Cited

U.S. PATENT DOCUMENTS

| | | | |
|---|---|---|---|
| 6,157,156 A | 12/2000 | Tsuruta | |
| 6,317,637 B1 * | 11/2001 | Limroth | G05B 5/01 700/37 |
| 2004/0167659 A1 * | 8/2004 | Scherer | G05B 19/4163 700/173 |
| 2015/0205282 A1 | 7/2015 | Tezuka et al. | |

FOREIGN PATENT DOCUMENTS

| | | |
|---|---|---|
| CN | 103034249 A | 4/2013 |
| CN | 103838139 A | 6/2014 |
| CN | 104199293 A | 12/2014 |
| CN | 104808593 A | 7/2015 |
| JP | 2003025404 A | 1/2003 |
| JP | 2006518674 A | 8/2006 |

(Continued)

OTHER PUBLICATIONS

ControlGuru (https://controlguru.com/integral-action-and-pi-control) (Year: 2015).*

(Continued)

*Primary Examiner* — Brian W Wathen
*Assistant Examiner* — Hung H Dang
(74) *Attorney, Agent, or Firm* — RatnerPrestia

(57) ABSTRACT

A numerical controller performs PID control to control the move speed of an axis for driving a spindle such that a load value of the spindle becomes constant. When the spindle load value exceeds a threshold value, a speed calculation unit of the numerical controller calculates an override for the feed rate of the axis instructed by command data such that the load value of the spindle becomes constant, and, at the start of the speed calculation process, assigns the override (Continued)

just before the start of the speed calculation process to an initial value of an integral term or an offset for PID control.

1 Claim, 10 Drawing Sheets

(56) References Cited

FOREIGN PATENT DOCUMENTS

| | | |
|---|---|---|
| JP | 2011079222 A | 4/2011 |
| WO | WO 94/144569 | 7/1994 |
| WO | 9828837 A1 | 7/1998 |

OTHER PUBLICATIONS

Notification of Reasons for Refusal for Japanese Application No. 2015-230615, dated Nov. 21, 2017 with translation, 4 pages.
Chinese Office Action for Chinese Application No. 201611035383. 1, with English Translation, dated Aug. 20, 2018—13 pages.

\* cited by examiner

NUMERICAL CONTROLLER FOR CONTROLLING FEED RATE BASED ON SPINDLE LOAD

BACKGROUND OF THE INVENTION

1. Field of the Invention

The present invention relates to a numerical controller for controlling a feed rate based on a spindle load.

2. Description of the Related Art

A technique has been known which improves cutting speed and cutting tool life by controlling a feed rate such that a spindle load becomes constant (for example, International Publication No. WO94/14569 and the like). There are various conceivable methods for feed rate control. Generally, PID control is widely used as control for maintaining a controlled value at a constant value. Output by PID control can generally be calculated by the following equation (1):

$$O(t) = K_p e_L(t) + \int_{t_0}^{t} K_i e_L(t) dt + K_d \frac{d}{dt} e_L(t) + C \quad (1)$$

$O(t)$ = output value $e_L(t)$ = difference between desired value and present (time $t$) value of controlled object $K_p$ = gain of propotional term for *PID* control $K_i$ = gain of integral term for *PID* control $K_d$ = gain of derivative term for *PID* control $C$ = offset for *PID* control In the case where a feed rate is controlled such that a spindle load becomes constant, the spindle load can be brought close to a desired value by assigning an override (feed rate) to O(t), assigning the difference between a desired spindle load and a spindle load at time t to $e_L(t)$, and assigning an appropriate value to the constant.

In a state in which cutting is not being performed, that is, when a spindle is running idle, the spindle load does not vary even if the feed rate is increased. Accordingly, it is desirable that PID control is performed only when cutting is being performed, that is, only when the spindle load is not less than a constant value. In the above-described equation (1), to denotes the time when PID control is started.

FIGS. 7 and 8 are views showing changes in a cut depth, an override, and a spindle load when a tool cuts into a workpiece in general PID control. It should be noted that FIG. 7 shows the case where a cut depth is large, and FIG. 8 shows the case where a cut depth is small.

In simple PID control, no offset is included, and the value of the integral term on the right-hand side of equation (1) at the start of control is 0. Accordingly, when control is started, the override decreases once and then comes close to the desired value as shown in FIGS. 7 and 8.

FIGS. 9 and 10 are views showing changes in a cut depth, an override, and a spindle load when a tool cuts into a workpiece in PID control in which a constant value is assigned to the offset. It should be noted that FIG. 9 shows the case where a cut depth is large, and FIG. 10 shows the case where a cut depth is small.

In the case where the offset is equal to the override when an equilibrium state is reached, the equilibrium state is instantaneously established as shown in FIG. 9. However, in the case where the offset and the override in an equilibrium state differ due to a change in the cut depth, there is a possibility that the override decreases once and then reaches an equilibrium state as shown in FIG. 10.

The above-described prior art technique has a problem that the override becomes discontinuous when control is switched if control is performed without assigning an initial value to the integral term or the offset. Moreover, even in the case where an initial value is assigned to the integral term or the offset, there is a problem that merely assigning a constant may be not enough to prevent the override from becoming discontinuous due to variations in the override or variations in the cut depth just before control.

SUMMARY OF THE INVENTION

Accordingly, an object of the present invention is to provide a numerical controller for performing PID control in which an override does not become discontinuous.

In the present invention, when control is started, an initial value of an integral term or an offset is set by any of the following methods.

Method 1: The override just before the start of control is assigned to the initial value of the integral term or the offset.

Method 2: A value which makes the override continuous is assigned to the initial value of the integral term or the offset.

A numerical controller according to the present invention is configured to, in controlling a machine including a spindle and an axis for driving the spindle, based on a programmed command, perform PID control for controlling move speed of the axis such that a spindle load value of the spindle becomes constant, and includes a command program analysis unit configured to analyze the programmed command and generate command data for providing instructions on motion of the axis and a speed calculation unit configured to start a speed calculation process for calculating an override for a feed rate of the axis instructed by the command data such that the spindle load value becomes constant, when the spindle load value exceeds a preset threshold value.

A first aspect of the speed calculation unit is configured to assign an override just before start of the speed calculation process to an initial value of an integral term or an offset for the PID control at the start of the speed calculation process.

A second aspect of the speed calculation unit is configured to assign a value which makes the override calculated by the PID control equal to an override just before start of the speed calculation process to an initial value of an integral term or an offset for the PID control at the start of the speed calculation process.

The present invention provides a numerical controller for performing PID control in which an override does not become discontinuous. Accordingly, cycle time is reduced, and an impact on a machine is reduced.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
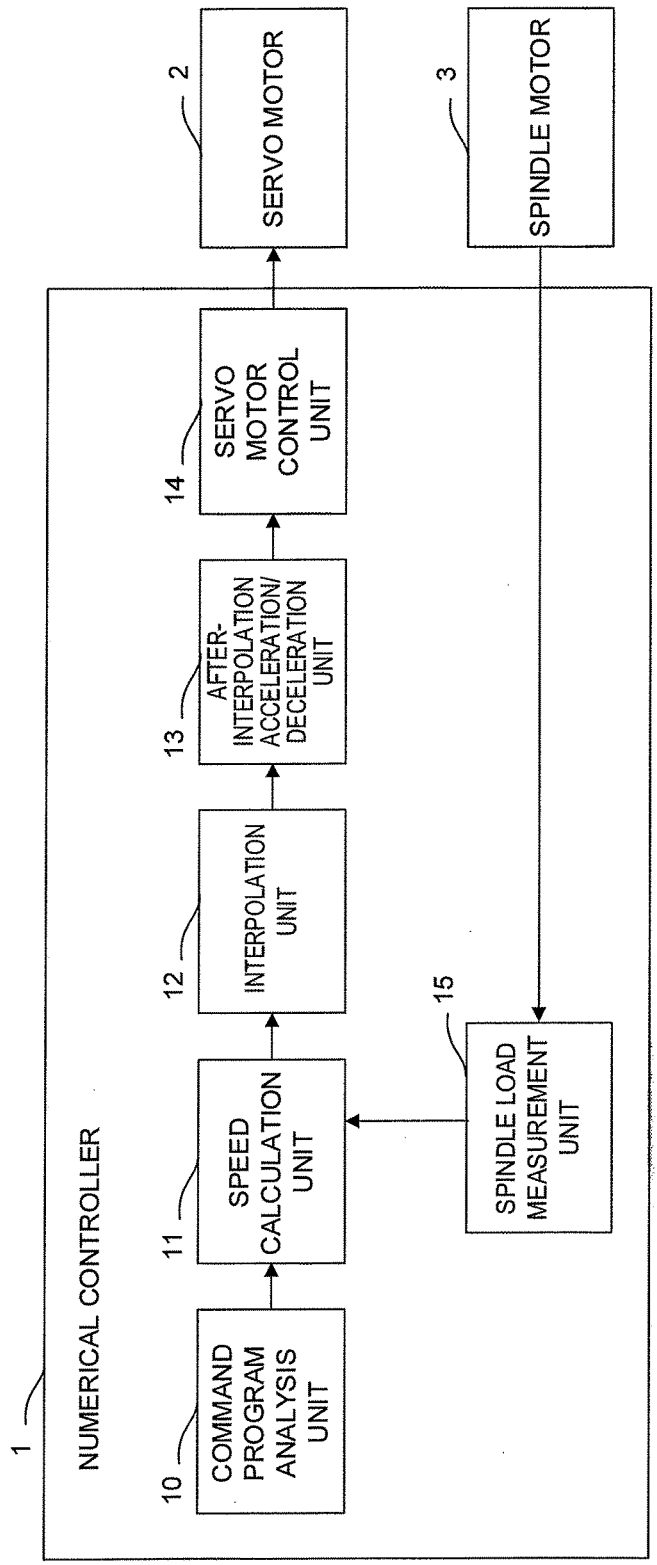
FIG. 1 is a schematic block diagram of a numerical controller according to one embodiment of the present invention.

An overview of the configuration of a numerical controller according to one embodiment of the present invention will be described with reference to a functional block diagram of FIG. 1.

A numerical controller 1 according to this embodiment includes a command program analysis unit 10, a speed calculation unit 11, an interpolation unit 12, an after-interpolation acceleration/deceleration unit 13, a servo motor control unit 14, and a spindle load measurement unit 15.

The command program analysis unit 10 sequentially reads and analyzes blocks, which provide instructions on the operation of a machine as a controlled object, of a program or the like stored in memory (not shown), creates command data for providing instructions on the motion of an axis driven by a servo motor 2 based on results of the analysis, and outputs the created command data to the speed calculation unit 11.

The speed calculation unit 11 calculates an override for a feed rate in the command data inputted from the command program analysis unit 10 based on a spindle load on a spindle motor 3 measured by the spindle load measurement unit 15 such that the spindle load becomes constant. Then, command data obtained by adjusting a speed based on the calculated override is outputted to the interpolation unit 12.

The interpolation unit 12 generates points (interpolation data) for respective interpolation periods on a commanded path instructed by the command data, based on the command data after speed adjustment inputted from the speed calculation unit 11, and outputs the interpolation data to the after-interpolation acceleration/deceleration unit 13.

The after-interpolation acceleration/deceleration unit 13 calculates the speed of each axis for each interpolation period based on the interpolation data inputted from the interpolation unit 12, and outputs a result of the calculation to the servo motor control unit 14. Then, the servo motor control unit 14 controls the servo motor 2 for driving an axis of the machine as a controlled object, based on the output from the after-interpolation acceleration/deceleration unit 13.

Next, the calculation of speed carried out by the speed calculation unit 11 will be described. In the present invention, general PID control is used with the following extensions. Moreover, PID control in the present invention is assumed to exclude PID control relating to the prior art technique and include the following extensions.

Extension 1: $e_L(t)$ includes not only the difference between a desired value and a present value of a controlled object but also all of functions satisfying the following conditions:

$$e_L(t1)=0 \text{ when } L(t1)=L_i \qquad \text{Condition 1:}$$

$$e_L(t1) \geq e_L(t2) \text{ when } L(t1) \leq L(t2) \qquad \text{Condition 2:}$$

where $L_i$ is the desired value of the controlled object, and $L(t)$ is the present value (time t) of the controlled object.

Extension 2: The gain of each term includes 0. In other words, any combination of P, I, and D, such as P control or PI control, is included.

Extension 3: For an integral term, any initial value can be set at the start of control ($t=t_0$) if necessary. In the calculation of the integral term for the case where an initial value is set, a value obtained by adding the initial value to a result of general integration over the interval from to to t is used as a result of the calculation of the integral term. Moreover, such an integral term is expressed as an integral term with a lower limit omitted. Further, the initial value of the integral term is expressed as an integral term in which an upper limit is to and in which the lower limit is omitted.

Extension 4: Any value can be assigned to an offset at the start of control.

Based on the above-described extensions, the following equation (2) is used as an equation for PID control in the present invention:

$$O(t) = K_p e_L(t) + \int^t K_i e_L(t) dt + K_d \frac{d}{dt} e_L(t) + C \qquad (2)$$

First, a first example of the calculation of speed carried out by the speed calculation unit 11 of the numerical controller in FIG. 1 will be described below.

When the spindle load on the spindle motor 3 measured by the spindle load measurement unit 15 exceeds a preset load value, the speed calculation unit 11 starts controlling an override for the servo motor 2 by PID control using the above-described equation (2). In the speed calculation unit 11, the override just before the start of PID control is assigned to the initial value of the integral term in the above-described equation (2) when PID control is started (time $t=t_0$). This reduces variations in the override and can prevent a steep decrease in the override at the start of PID control. Processing procedures performed by the speed calculation unit 11 at the start of PID control are as follows:

Procedure 1-1: At the start of PID control (when the spindle load reaches a control-effective load), the override just before the start of PID control is assigned to the integral term or the offset, and control is started.

Procedure 1-2: In the case where the override just before the start of PID control, which is denoted by Ob, is assigned to the integral term, the following equation (3) is satisfied; and, in the case where Ob is assigned to the offset, the following equation (4) is satisfied. In the case where the override Ob is assigned to the integral term, the initial value of the offset is set to 0. Similarly, in the case where the override Ob is assigned to the offset, the initial value of the integral term is set to 0.

$$\int^{t_0} K_i e_L(t) dt = O_b \quad (3)$$

$$C = O_b \quad (4)$$

Figure 2:
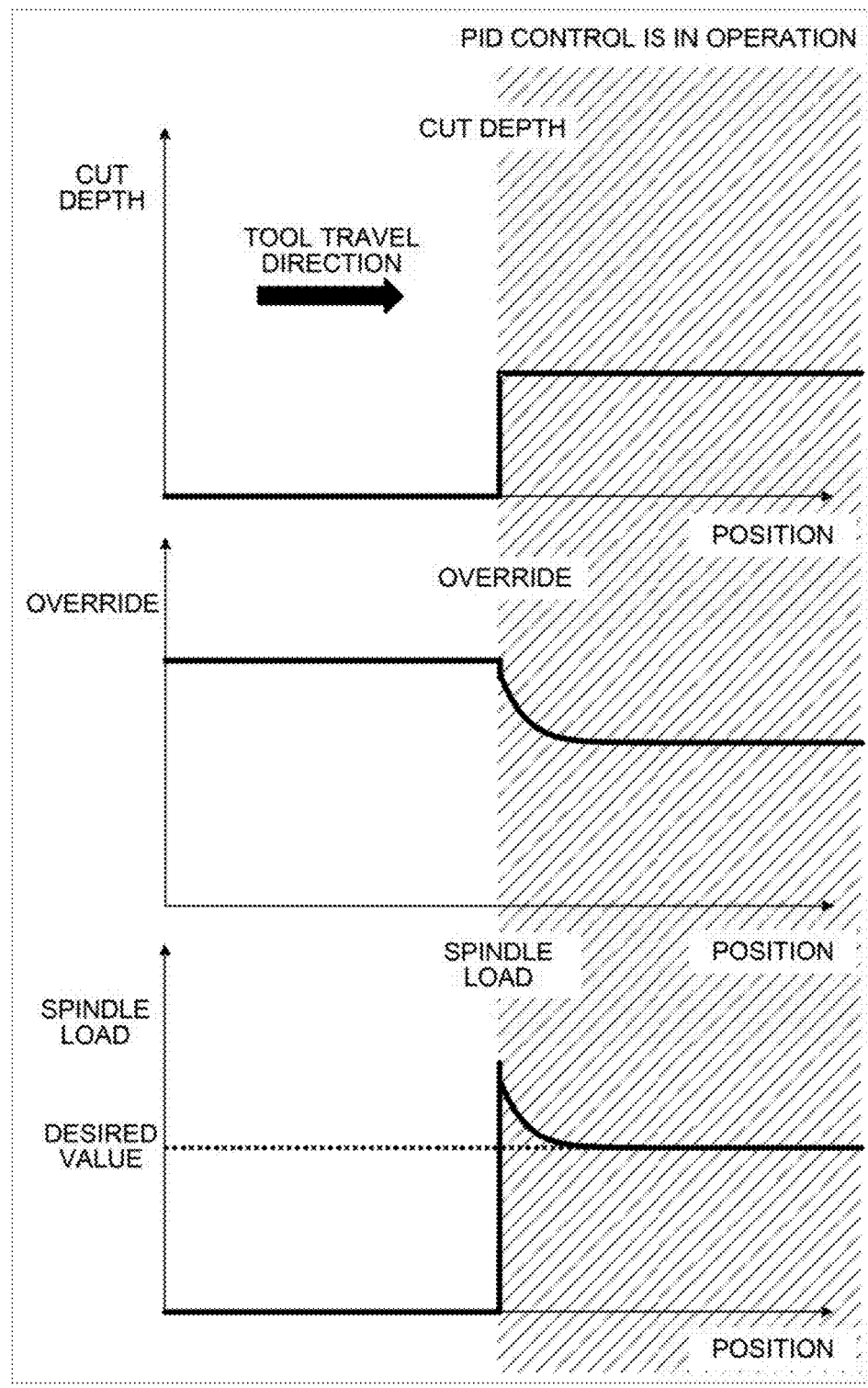
FIG. 2 is a view showing changes in a cut depth, an override, and a spindle load when a tool cuts into a workpiece (for the case of a large cut depth) in a first example of the calculation of speed carried out by a speed calculation unit of the numerical controller in FIG. 1.
Figure 3:
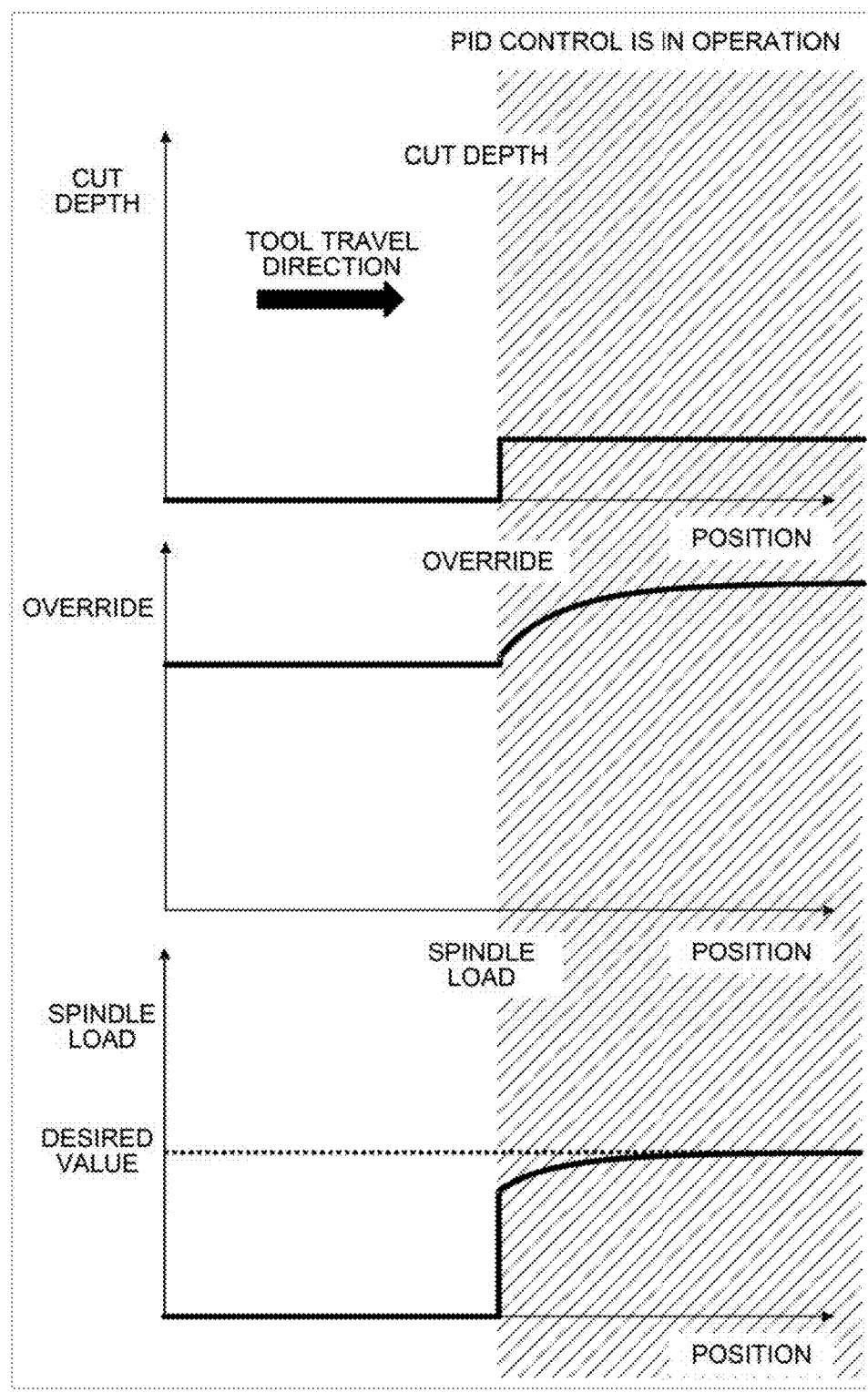
FIG. 3 is a view showing changes in a cut depth, an override, and a spindle load when a tool cuts into a workpiece (for the case of a small cut depth) in the first example of the calculation of speed carried out by the speed calculation unit of the numerical controller in FIG. 1.

FIGS. 2 and 3 are views showing changes in a cut depth, an override, and a spindle load when a tool cuts into a workpiece, in a first example of the calculation of speed carried out by the speed calculation unit 11 of the numerical controller in FIG. 1. It should be noted that FIG. 2 shows the case where a cut depth is large, and FIG. 3 shows the case where a cut depth is small.

Next, a second example of the calculation of speed carried out by the speed calculation unit 11 of the numerical controller in FIG. 1 will be described below.

When the spindle load on the spindle motor 3 measured by the spindle load measurement unit 15 exceeds a preset load value, the speed calculation unit 11 starts controlling an override for the servo motor 2 by PID control using the above-described equation (2). In the speed calculation unit 11, a value which makes an override to be outputted equal to the override just before the start of PID control is assigned to the initial value of the integral term or the offset in the above-described equation (2) when PID control is started (time t=$t_0$). This eliminates variations in the override and can prevent a steep decrease in the override at the start of PID control. Processing procedures performed in the speed calculation unit 11 at the start of PID control are as follows:

Procedure 2-1: At the start of PID control (when the spindle load reaches a control-effective load), a value which makes the override continuous is assigned to the integral term or the offset, and control is started.

Procedure 2-2: By deforming the above-described equation (2) as an equation for PID control, the output value satisfies equation (5) below in the case where the above-described value is assigned to the integral term and satisfies equation (6) below in the case where the above-described value is assigned to the offset. In the case where the above-described value is assigned to the integral term, the initial value of the offset is set to 0; and, in the case where the above-described value is assigned to the offset, the initial value of the integral term is set to 0.

$$\int^{t_0} K_i e_L(t) dt = O_b - K_p e_L(t_0) - K_d \frac{d}{dt} e_L(t)|_{t=t_0} \quad (5)$$

$$C = O_b - K_p e_L(t_0) - K_d \frac{d}{dt} e_L(t)|_{t=t_0} \quad (6)$$

It should be noted that if this is applied to the above-described equation (2), O(t0)=Ob is obtained, and an integral over one period is not calculated. Accordingly, the output may be calculated after an integral over one period is calculated.

Figure 4:
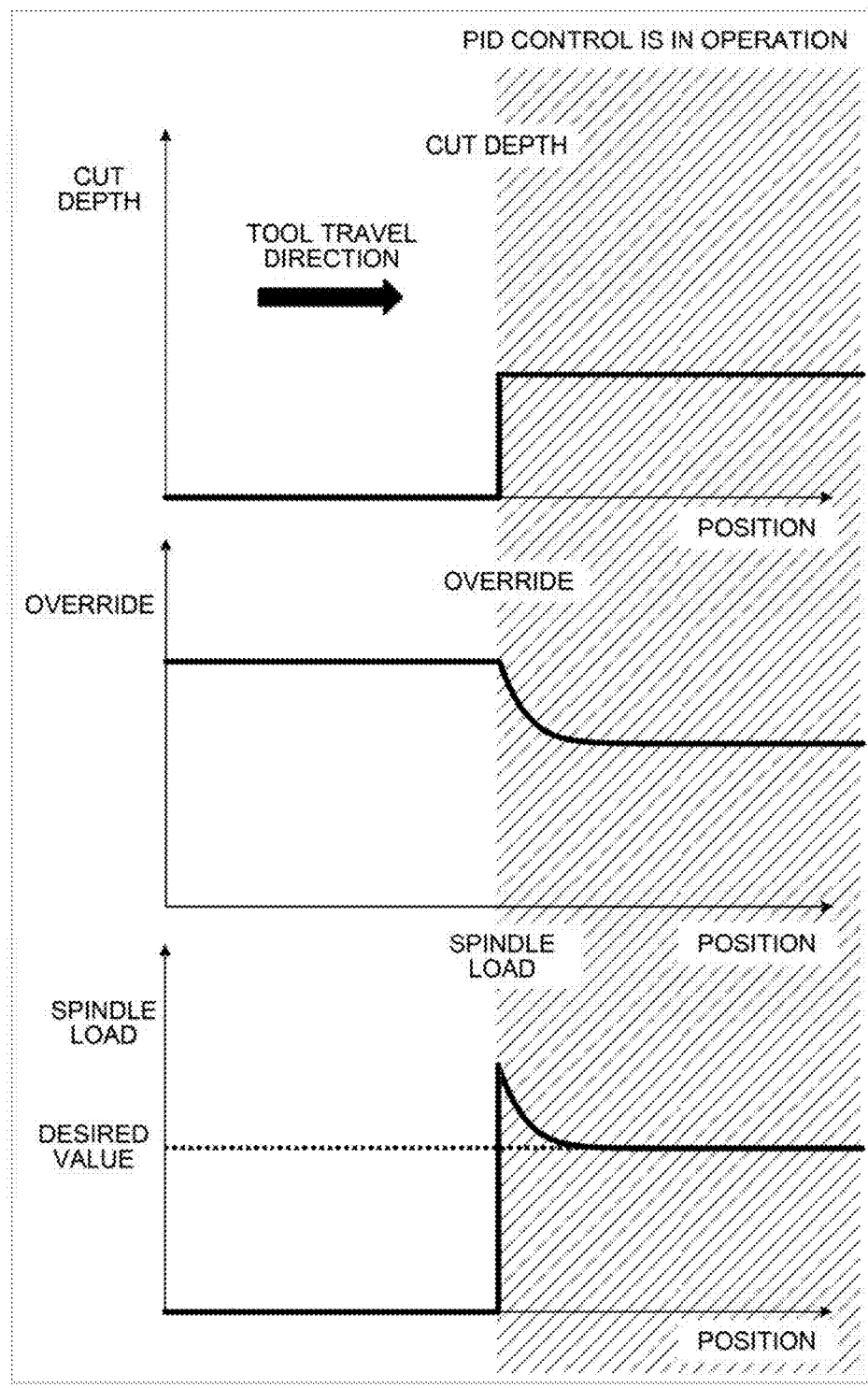
FIG. 4 is a view showing changes in a cut depth, an override, and a spindle load when a tool cuts into a workpiece (for the case of a large cut depth) in a second example of the calculation of speed carried out by the speed calculation unit of the numerical controller in FIG. 1.
Figure 5:
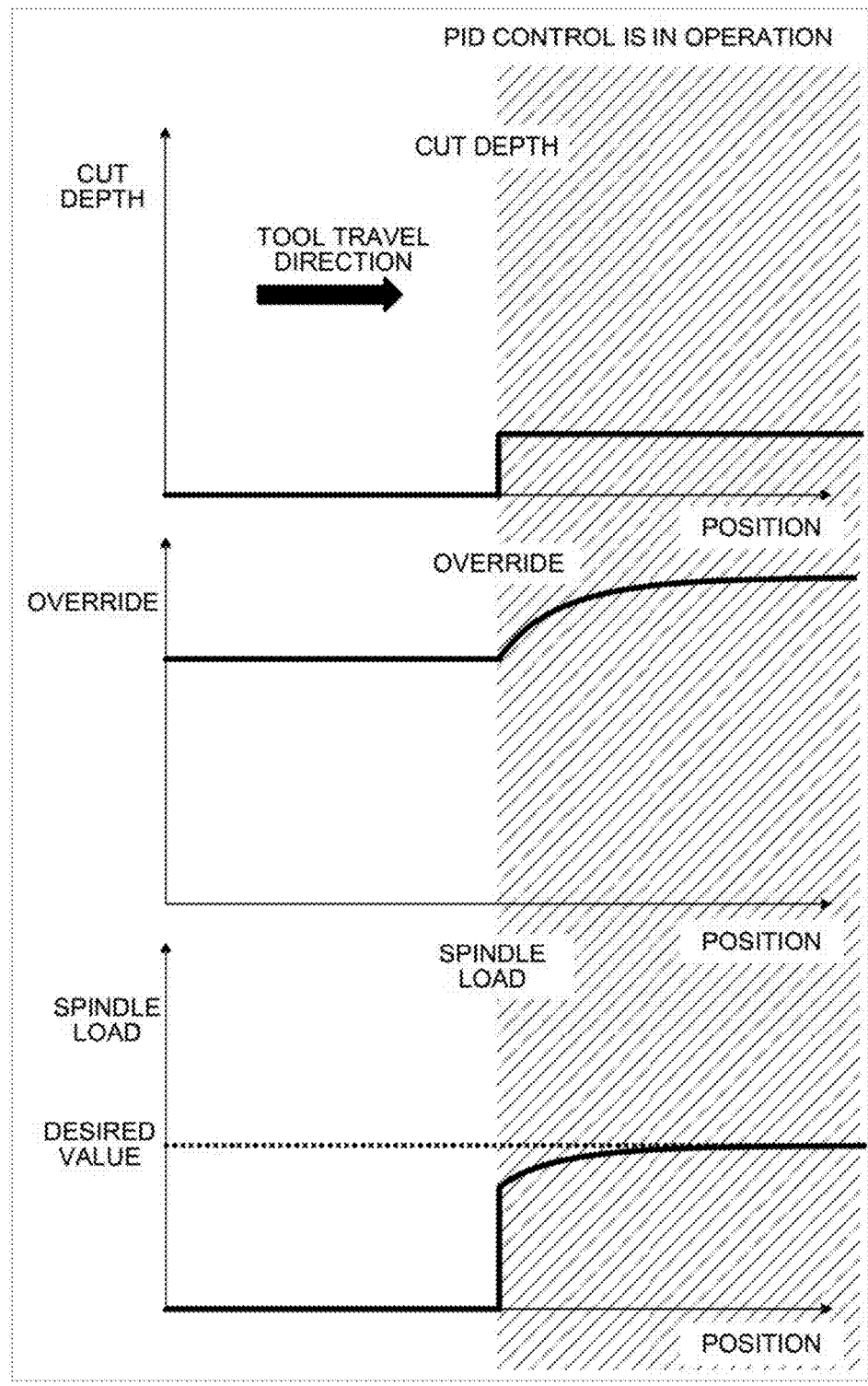
FIG. 5 is a view showing changes in a cut depth, an override, and a spindle load when a tool cuts into a workpiece (for the case of a small cut depth) in the second example of the calculation of speed carried out by the speed calculation unit of the numerical controller in FIG. 1.

FIGS. 4 and 5 are views showing changes in a cut depth, an override, and a spindle load when a tool cuts into a workpiece, in a second example of the calculation of speed carried out by the speed calculation unit 11 of the numerical controller in FIG. 1. It should be noted that FIG. 4 shows the case where a cut depth is large, and FIG. 5 shows the case where a cut depth is small.

Figure 6:
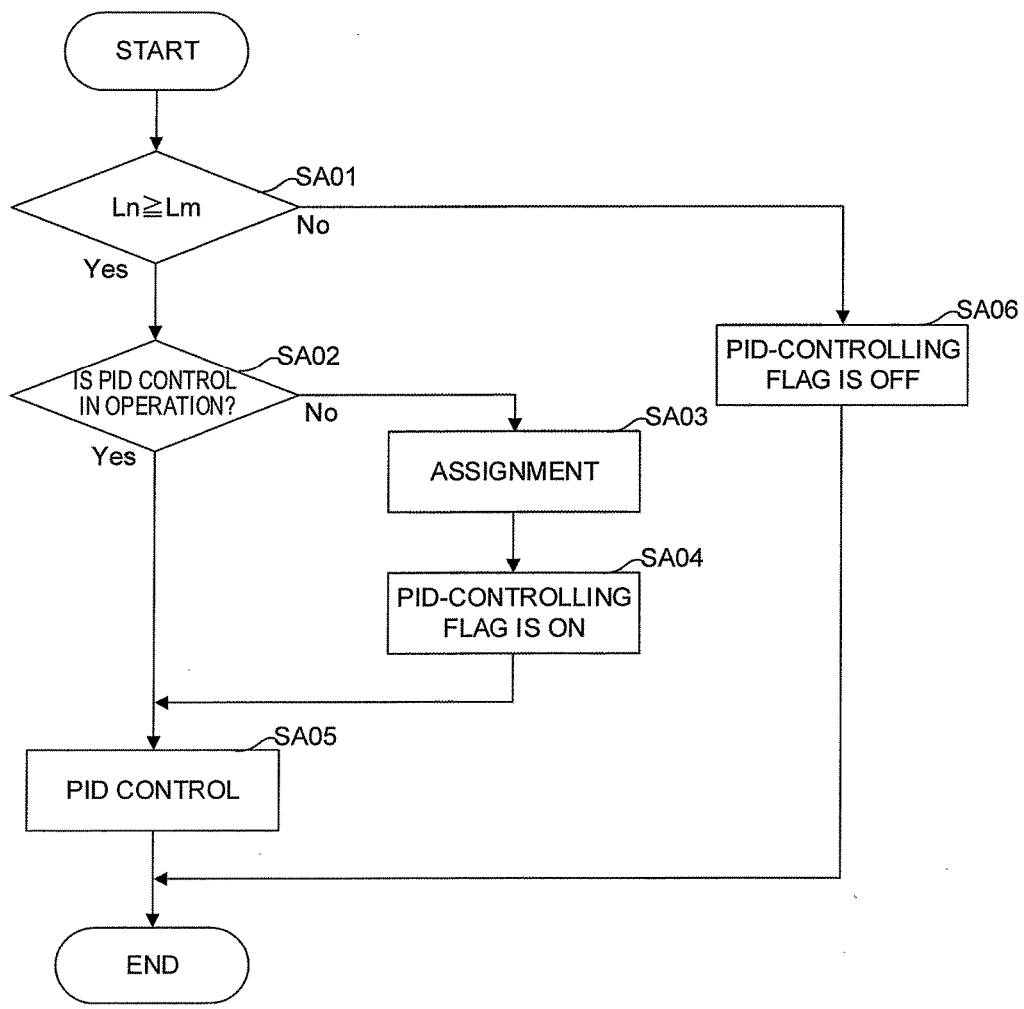
FIG. 6 is a flowchart showing the flow of processing carried out by the speed calculation unit of the numerical controller in FIG. 1.
Figure 7:
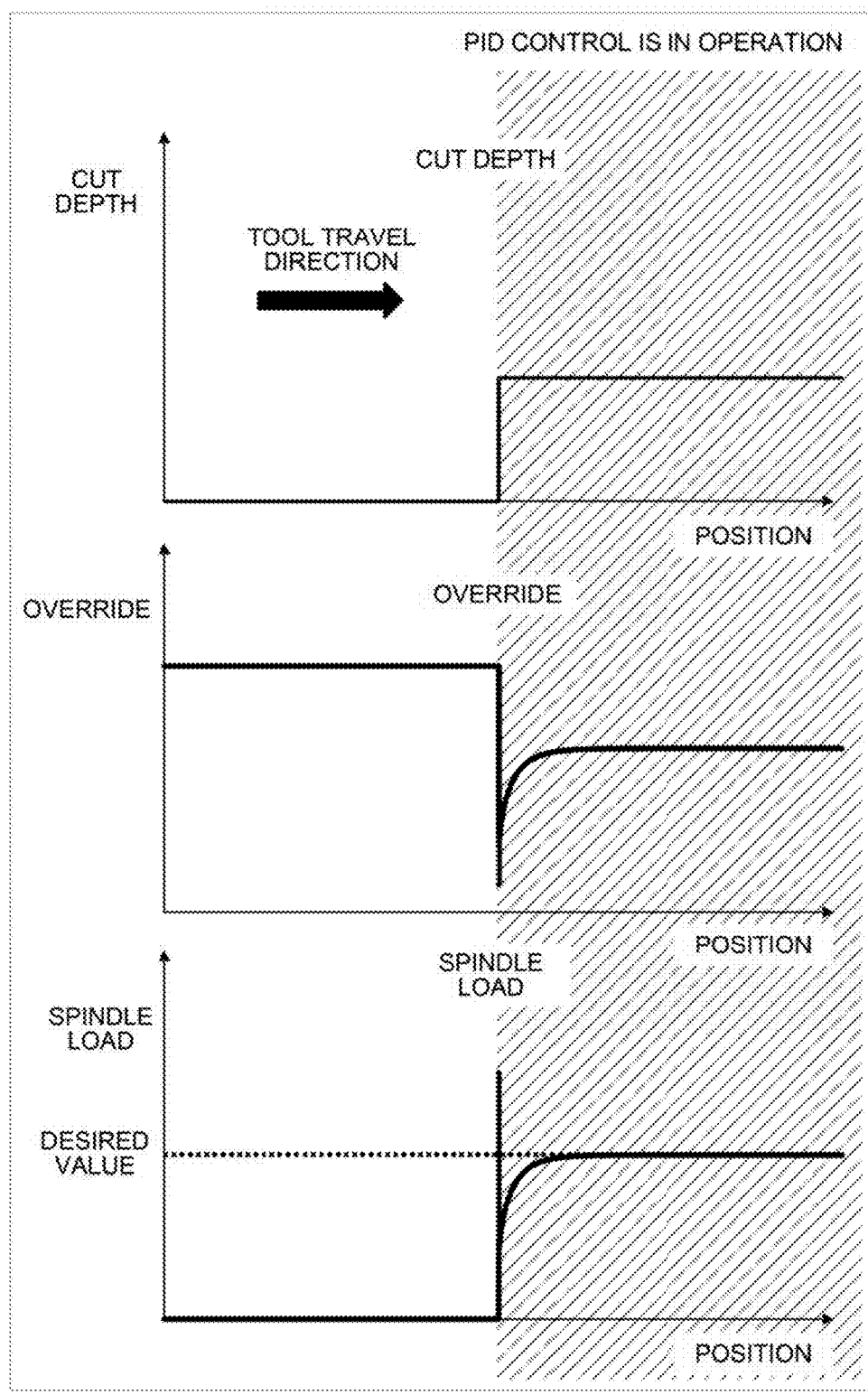
FIG. 7 is a view showing changes in a cut depth, an override, and a spindle load when a tool cuts into a workpiece (for the case of a large cut depth) in prior art PID control.
Figure 8:
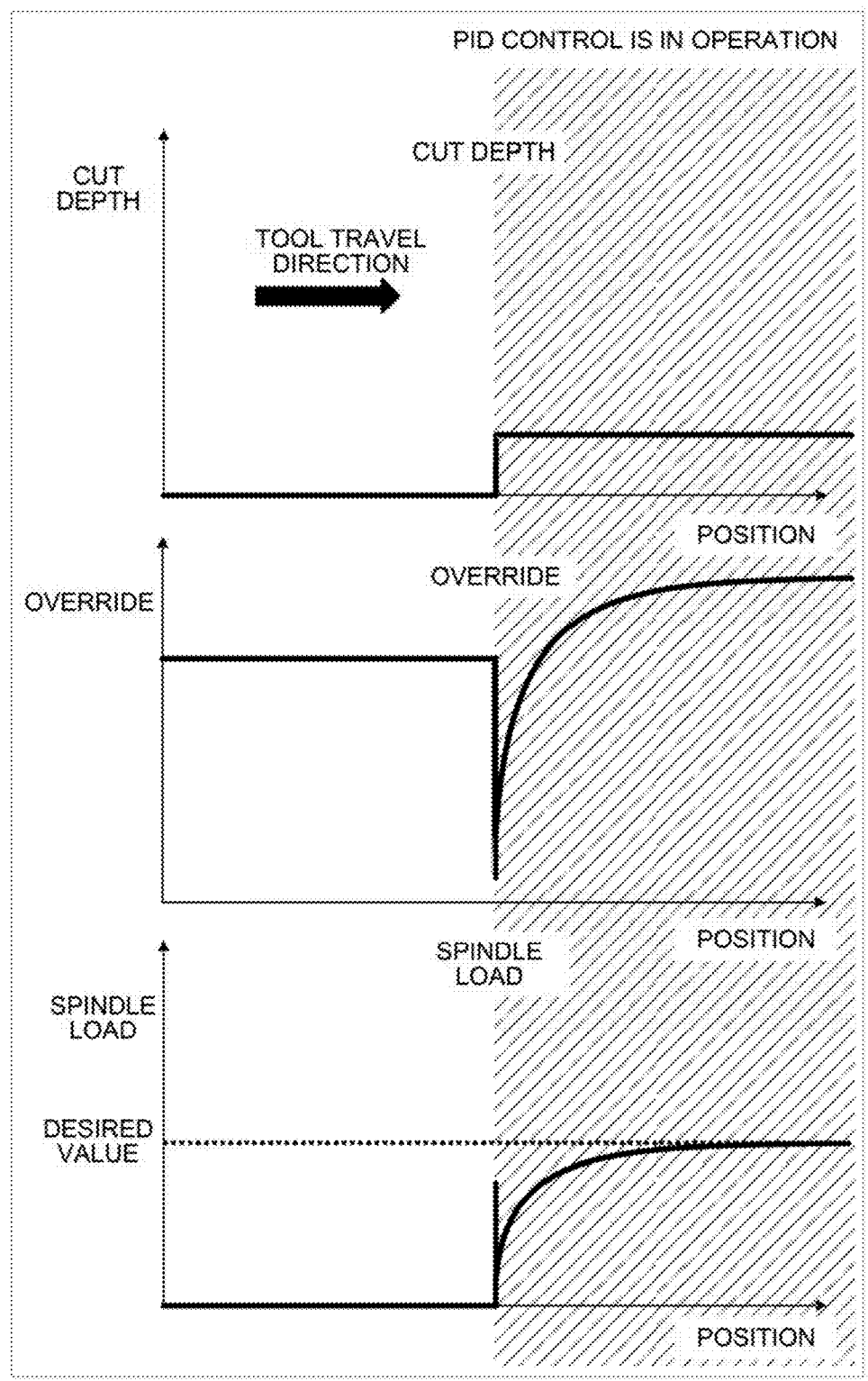
FIG. 8 is a view showing changes in a cut depth, an override, and a spindle load when a tool cuts into a workpiece (for the case of a small cut depth) in prior art PID control.
Figure 9:
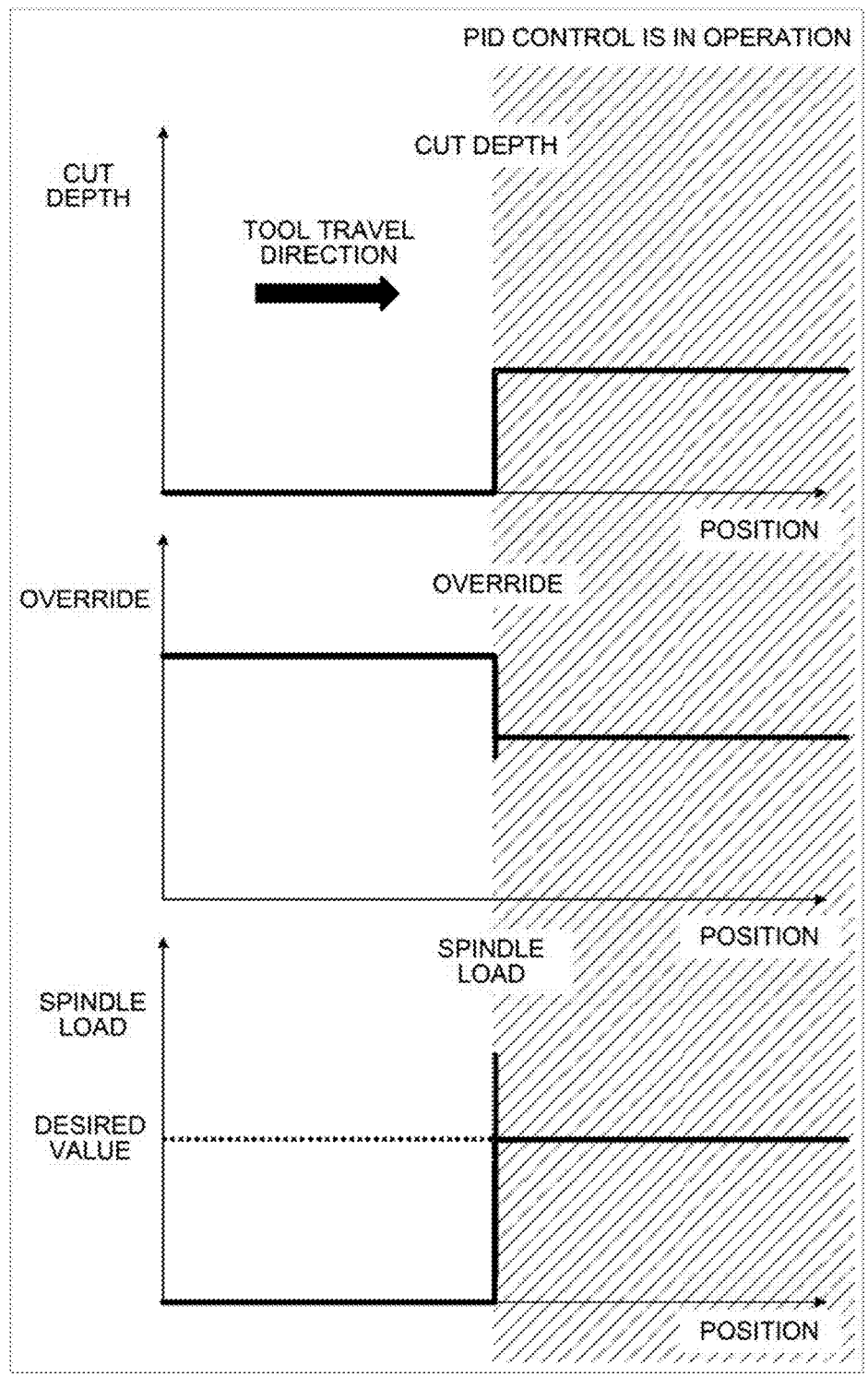
FIG. 9 is a view showing changes in a cut depth, an override, and a spindle load when a tool cuts into a workpiece (for the case of a large cut depth) in PID control in which a constant value is assigned to an offset.
Figure 10:
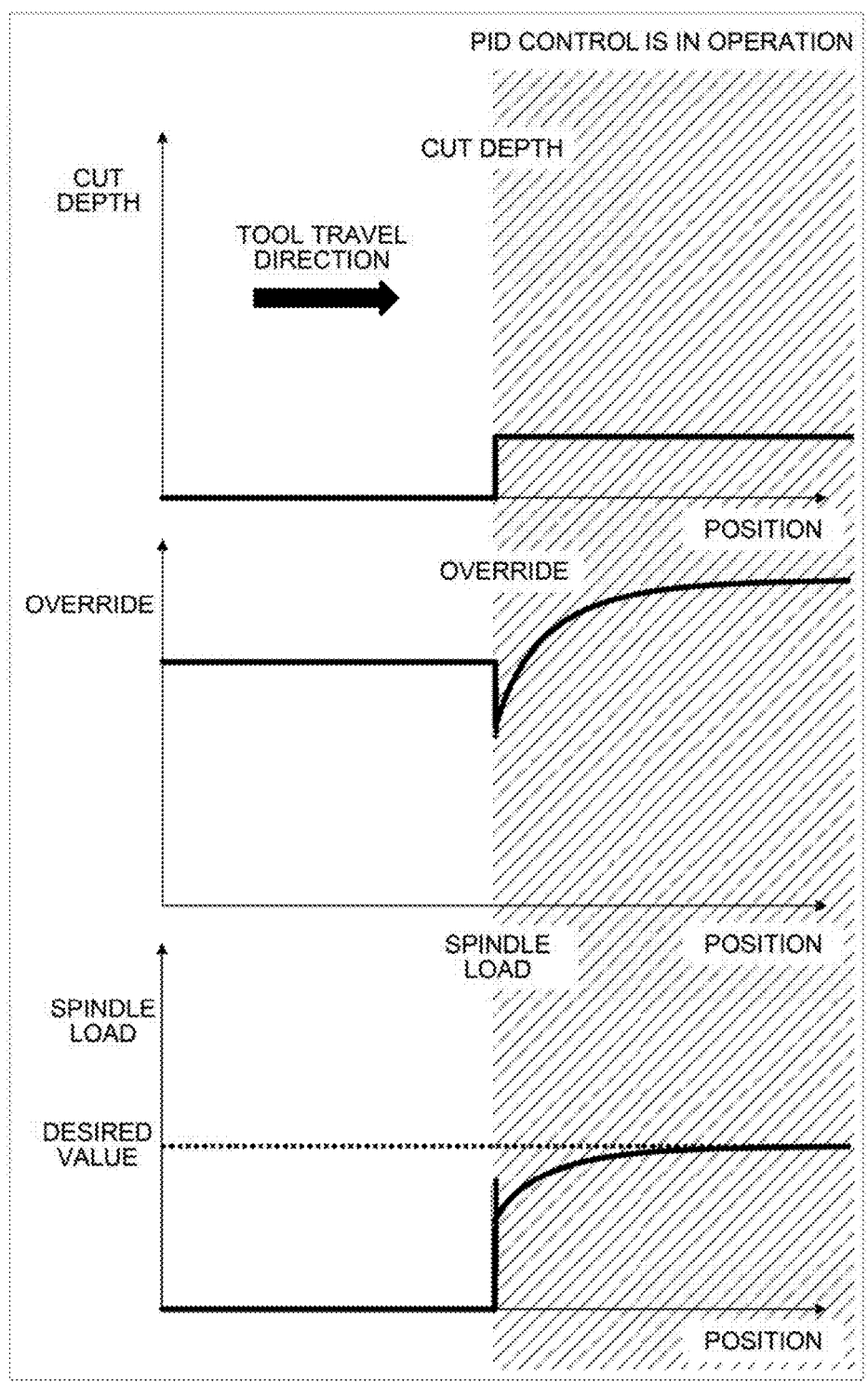
FIG. 10 is a view showing changes in a cut depth, an override, and a spindle load when a tool cuts into a workpiece (for the case of a small cut depth) in PID control in which a constant value is assigned to an offset.

FIG. 6 is a flowchart showing the flow of processing carried out by the speed calculation unit 11 of the numerical controller in FIG. 1. It should be noted that a PID-controlling flag is set to OFF at the start of machining. The processing is explained below according to respective steps.

[Step SA01] The speed calculation unit 11 determines whether or not the present spindle load Ln on the spindle motor 3 measured by the spindle load measurement unit 15 is not less than a preset spindle load value Lm at which PID control becomes effective. If the spindle load Ln is not less than the spindle load value Lm, the processing proceeds to step SA02; otherwise the processing proceeds to step SA06.

[Step SA02] The speed calculation unit 11 checks the PID-controlling flag and determines whether PID control is currently being performed or not. If PID control is currently being performed, the processing proceeds to step SA05; and, if PID control is not currently being performed, the processing proceeds to step SA03.

[Step SA03] The speed calculation unit 11 carries out assignment to the initial value of the integral term or the offset in the equation (2) described above.

[Step SA04] The speed calculation unit 11 sets the PID-controlling flag to ON and starts a process for the calculation of the override for the servo motor 2 by PID control.

[Step SA05] The speed calculation unit 11 executes the process for the calculation of the override for the servo motor 2 by PTD control using equation (2).

[Step SA06] The speed calculation unit 11 sets the PID-controlling flag to OFF (reset) and ends the process for the calculation of the override for the servo motor 2 by PID control.

While embodiments of the present invention have been described above, the present invention is not limited only to the above-described examples of embodiments, but can be carried out in various aspects by making appropriate modifications thereto.

The invention claimed is:

1. A numerical controller which, in controlling a machine including a tool, a spindle motor for driving the tool and a servo motor for driving the machine along an axis, based on a programmed command, performs PID control for controlling the servo motor to control move speed of the machine along the axis such that a spindle load value of the spindle motor becomes constant, the numerical controller comprising:

a processor configured to:
analyze the programmed command and generate command data for providing instructions on driving the machine along the axis with the servo motor;
control the servo motor to drive the machine along the axis based on the command data; and
determine the spindle load value as the machine is driven along the axis, and in response to determining that the spindle load value exceeds the preset threshold value:

set an override for a feed rate of the machine along the axis to an initial value of an integral term with an offset of zero for the PID control, and then
start a speed calculation process for calculating the override such that the spindle load value becomes constant.

\* \* \* \* \*